No. 763,574.                                   Patented June 28, 1904.

UNITED STATES PATENT OFFICE.

RAYMOND VIDAL, OF PARIS, FRANCE.

PREPARATION OF SALTS OF IRON FOR USE IN OIL-COLORS.

SPECIFICATION forming part of Letters Patent No. 763,574, dated June 28, 1904.

Application filed June 3, 1902. Serial No. 110,036. (No specimens.)

*To all whom it may concern:*

Be it known that I, RAYMOND VIDAL, a citizen of the French Republic, residing in Paris, France, have invented certain new and useful Improvements in the Process for the Preparation of Salts of Iron for Use in Oil-Colors, (for which I have obtained a patent in France No. 315,694, bearing date November 7, 1901,) of which the following is a specification.

The process forming the object of the present invention has for its purpose the preparation of salts of iron which are immediately capable of use without requiring an intermediary grinding, as in the case of English red.

The said process uses the well-known property that a mixture of protoxid of iron and sulfates of iron possesses the quality that when they are moderately heated they burn out on exposure to air, involving sulfurous acid, so that the iron salts are obtained in the form of an absolutely impalpable powder.

The labors of Béchamp have shown that sulfate of iron and iron could not be utilized for reducing nitrated compounds; but I have discovered that the reactions employed in these trials were defective, for in bringing into reaction suitable proportions of sulfate of iron and iron I have been able to reduce the nitrated compounds of the aromatic series.

My process consists, first, in treating reducible matters—such as nitro benzol, oxyazo benzol, nitro or dinitro phenol, nitro or dinitro cresols, and nitro or dinitro naphtols, nitroso phenols, nitroso cresols, or nitroso naphtols, nitro naphtalenes, dinitro naphtalenes, &c.—with a heated aqueous solution of sulfate of iron and with turnings or filings of cast-iron or wrought-iron. Thus in heating to ebullition in an iron vessel provided with a mechanical stirrer a mixture of nitro benzol one hundred and twenty-three kilograms, iron (cast-iron turnings) two hundred kilograms, sulfate of iron four hundred kilograms, I obtain anilin in a mixture of protoxid of iron and sulfate of iron; but in heating under the same conditions a mixture of nitro sophenol one hundred and twenty-three kilograms, iron (cast-iron shavings) two hundred kilograms, sulfate of iron four hundred kilograms, I obtain paramidophenol.

The equation of the chemical reaction which takes place in the latter example given is the following:

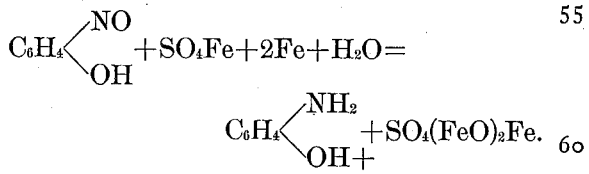

The approximate temperature of the moderate heating is of 80° centigrade.

The nitro sophenol may be replaced by oxyazo benzol or by a nitrated derivative of benzene or of naphtalene. By the use of oxyazo benzol anilin is produced together with paramidophenol.

In the above-mentioned reactions the proportions of sulfate of iron may be increased or decreased, so as to cause the quantity of sulfur of the mixture to be varied and even to obtain them mixed with oxids of iron.

The polybasic sulfates mixed with oxid of iron are separated out by filtration from the solution of the aromatic compound produced by reduction, and they are then treated in the following manner: They are placed in a furnace wherein they are moderately heated, about 80°, in such a manner that they are not calcined and that the residue of iron is burned, (because of the particular property of the mixture of protoxid of iron and sulfate of iron,) evolving sulfurous vapors.

An impalpable powder remains which assumes on cooling shades or tints varying according to the composition of the residual sulfates of iron, these shades or tints varying between orange yellow, violet-tinged reds, yellow browns, or red browns, or violet-tinged browns. They can in this state be employed directly in oil-colors without requiring an intermediary grinding, as in the case of English red, and impart a brightness or sheen superior to that of ordinary iron-colors.

What I claim, and desire to secure by Letters Patent, is—

A process for the preparation of an ironpigment which is immediately suitable to be utilized in oil-color without requiring an intermediary grinding, the said process consisting in treating nitrated aromatic compounds by a mixture of iron filings and a solution of sulfate of iron, filtering the basic sulfates of iron, mixed with oxid of iron, obtained by the said treatment, moderately heating the said basic sulfates of iron at a temperature not high enough to produce calcination of the same, and allowing the impalpable powder obtained by the said heating to cool.

In witness whereof I have hereunto set my hand in presence of two witnesses.

RAYMOND VIDAL.

Witnesses:
VICTOR VEYSU,
JULES FAYOLLET.